*Inventor*
J. HANDLEY

By [signature]
AGENT

April 18, 1961 J. HANDLEY 2,980,227
TYPE PRINTING APPARATUS
Filed June 22, 1959 2 Sheets-Sheet 2

*Inventor*
J. HANDLEY
By Paul Hemminger
AGENT

United States Patent Office 2,980,227

Patented Apr. 18, 1961

2,980,227

TYPE PRINTING APPARATUS

John Handley, Little Marland, Briar Hill, Purley, England

Filed June 22, 1959, Ser. No. 821,817

Claims priority, application Great Britain July 12, 1958

3 Claims. (Cl. 197—20)

The present invention relates to improvements in or relating to type printing apparatus.

It is common practice in telegraph and data processing work for messages to be stored on tape, either of the paper perforated variety or of the magnetic variety. This stored information is then frequently required as printed information on a sheet of paper. The present invention proposes a method by which the information may be printed more quickly than by a simple tape reader reading from the tape to a single printer.

According to the invention there is provided type printing apparatus, comprising a plurality of reading heads for reading information from a single tape and each controlling a corresponding printing head, the printing heads being arranged to print on the same sheet of paper.

One embodiment of the invention will now be described with reference to the accompanying drawings in which.

While one tape reading head is reading the characters of one group of characters from a perforated tape in succession, the other tape reading head is reading the characters of an adjacent group in succession. During reading of the characters of the adjacent groups by the tape reading heads, their associated type printing heads are simultaneously printing different halves of a single line of print in accordance with the characters read. Means are provided for moving read portions of the perforated tape clear of the reading heads after reading has taken place preparatory to the reading of following adjacent groups of characters on the tape, and further means are provided for repositioning the type printing heads to new start positions for the printing of a new single line of print in accordance with the characters read from following adjacent groups.

Figure 1:
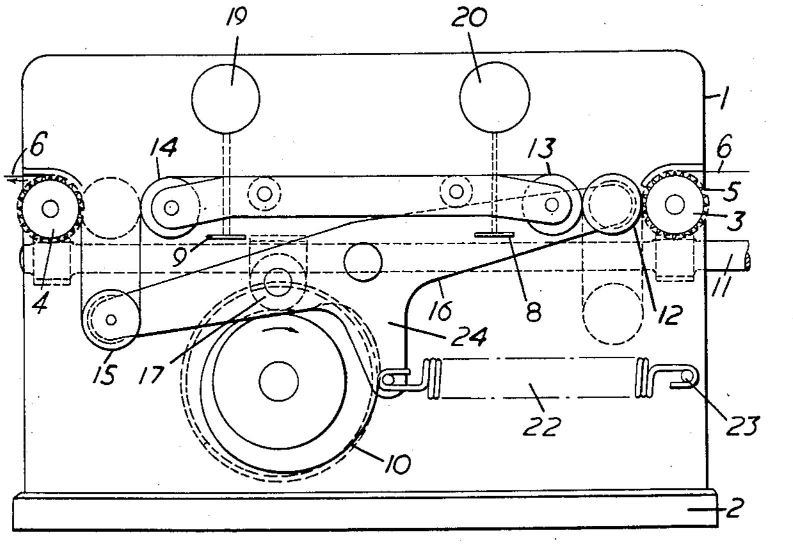
Fig. 1 shows a side elevation of a tape reader having two reading heads.

Referring now to Fig. 1, which shows a tape reader having two heads, the component parts are mounted on a back-plate 1, which is further mounted on a base-plate 2. Sprocket wheels 3 and 4 which constitute tape feeding members for feeding the perforated tape through the tape reader (hereinafter referred to as the reader) each have twenty-four teeth 5 equispaced around their peripheries and are driven in synchronism in an anticlockwise direction by shaft 11 through suitable gearing. A pair of rollers 13 and 14, rotatably mounted on the back-plate 1, are disposed between and substantially in line with the sprocket wheels 3 and 4. The tape reading heads 13 and 14, consisting respectively of light source 19 and photo-sensitive cell unit 9, and light source 20 and photo-sensitive cell unit 8, are arranged to read tape positioned between the rollers 13 and 14. The tape reading heads are mounted on the back-plate 1, three and one half inches apart which distance is equal to the space occupied by thirty-five characters on a perforated tape which constitutes a storage means for the characters. In its passage between the spocket wheels 3 and 4, the perforated tape 6 is guided past the two tape reading heads 13 and 14 and the combinations are read from the tape in conventional manner.

A pair of rollers 12 and 15 are rotatably mounted on opposite ends of a rocker arm 16, which is caused to rock about the axis of spindle 21 by the action of cam 10 on roller 17 on the rocker arm, cam 10 being driven by shaft 11 through suitable gearing. Contact between the roller 17 and the profile of cam 10 is maintained by the provision of a tension spring 22 disposed between an anchor pin 23 mounted in the back-plate 1, and an extending arm 24 on the rocker arm 16. The ratio of speeds between the sprocket wheels 3 and 4 and the cam 10 is seventy to twenty-four, so that the sprocket wheels will feed the perforated tape by seventy feed hole positions, which is equivalent to the space occupied by seventy characters, for each rotation of the cam 10.

Figure 2:
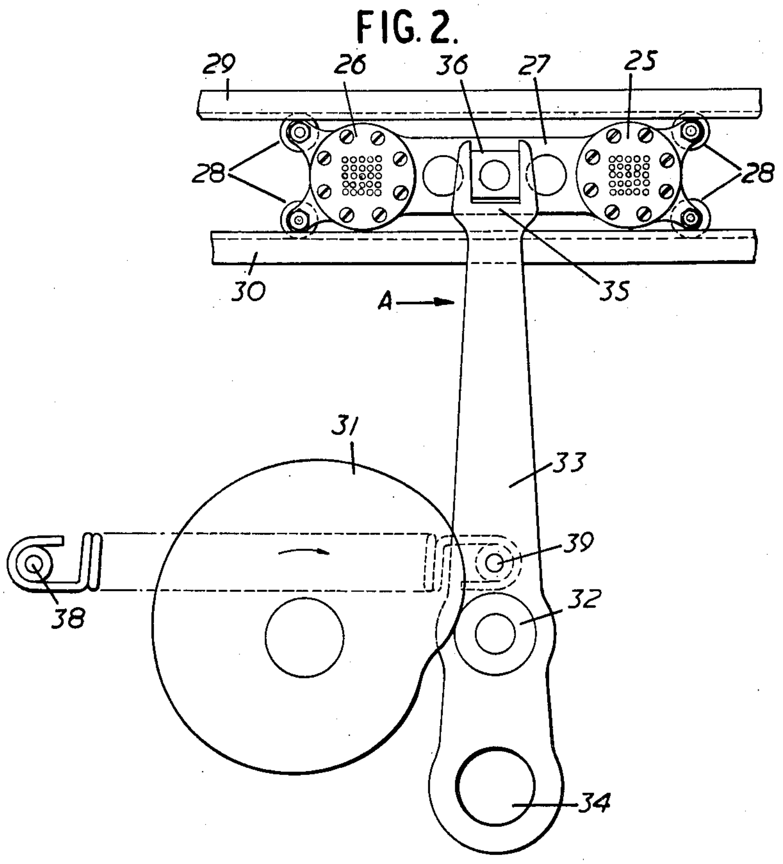
Fig. 2 shows a rear elevation of a type printer having two type printing heads associated with respective ones of the two reading heads of the reader of Fig. 1.

Referring now to Fig. 2, two printing heads 25 and 26, which, as shown, are of the type described in my British Patent No. 798,093, are spaced apart on a carriage 27 by a distance equivalent to that occupied by a half a line of print. Type printing head 25 is operatively associated with the first tape reading head, and type printing head 26 is operatively associated with the second tape reading head. Carriage 27, with the type printing heads thereon, is arranged to slide on rollers 28 in guide rails 29 and 30 in a letter feed direction as indicated by the arrow A and in a reverse direction for return of the type heads to start positions through the action of cam 31, via roller 32, on arm 33; cam 31 being rotated in synchronism with cam 10 of Fig. 1, and arm 33 being pivoted at one end on spindle 34 and arranged at its other end to embrace, by a trunnion portion 35, a trunnion block 36 pivoted on carriage 27 midway between the type printing heads 25 and 26. Contact between the profile of cam 31 and roller 32 on arm 33 is maintained by the provision of compression spring 37 suitably anchored at one end to a pin 38 on the mounting arrangement (not shown) for the type printer, and at its other end to a pin 39 on arm 33.

The reading and printing operations will now be described with reference to Figs. 1 and 2. Referring first to Fig. 1, the perforated tape is arranged in the tape reader, so that a portion of it is disposed over sprocket wheel 5, under roller 12 on rocker arm 16, over roller 13, between the light sources and the photo-sensitive cell units of the first and second tape reading heads, over roller 14, under roller 15 on rocker arm 16, and over sprocket 4 clear of the equipment.

When the reading and printing operations commence, the perforated tape 6 is fed at a constant rate by sprocket wheels 3 and 4, so that the characters of the first group of thirty-five characters on the tape are being read by the first tape reading head simultaneously with the characters of the second and adjacent group of thirty-five characters which are being read by the second tape reading head. As reading of the characters of the group takes place, the type printing heads 25 and 26 of Fig. 2, are being traversed on carriage 27 at reading speed across a sheet of paper such as a message form, through the action of cam 31 rotating in synchronism with cam 10 of Fig. 1, to print a single line of print; type printing head 26 printing the first half of the line, and type printing head 25 printing the second half of the line.

During the reading and printing operations, cam 10, rotates through three hundred degrees and causes rocker 16 to rotate in a clockwise direction so that roller 15 thereon is steadily lifted and roller 12 is gently lowered. In consequence, and during reading only, the perforated tape is passed between the light sources and photo-sensitive cell units of the tape reading heads at a slower rate than it is being fed through the tape reader by sprockets 3 and 4, this rate of movement relative to the reading heads being the correct reading speed.

After the characters of the first and second groups of thirty-five characters have been read by their respective reading heads, rocker arm 16 is caused to be actuated quickly in a clockwise direction by cam 10 rotating through the last sixty degrees of rotation. This rapid movement of the rocker arm causes rollers 15 and 12 to drop and lift respectively, so that the part of the perforated tape having the elements of the second group of thirty-five characters punched therein and which were read by the second tape reading head, is moved rapidly past the first tape reading head. In consequence the perforated tape is positioned in such a manner that the first characters of the third and fourth succeeding and adjacent groups of thirty-five characters each can be read by the first and second tape reading heads respectively during the next reading and printing cycle which follows.

During the movement of the part of the perforated tape, which embraces the group of characters read by second tape reading head between the first and second tape reading heads, the reading heads themselves are inhibited by the provision of circuit breaking means (not shown). This circuit-breaking means prevents the second group of thirty-five characters from being re-read by the first tape reading head, and prevents the following and third group of thirty-five characters, which are destined to be read by the first tape reading head, from being read by the second tape reading head.

During the rapid movement of the said part of the perforated tape between the first and second tape reading heads, type printing heads 25 and 26, of Fig. 2, are returned, from positions corresponding to the ends of their respective halves of the line which they have just printed, to start positions for printing their respective halves of a new line of print. This return action is effected by the rotation of cam 31 rotating through the last sixty degrees of one complete revolution in synchronism with the rotation of cam 10 of Fig. 1, through its last sixty degrees of one complete revolution. While these movements are taking place in the last sixty degrees of rotation, the paper on which printing is being performed will be advanced by a line feed operation in a conventional manner. Reading and printing operations continue in the manner described and as required until the message on the perforated tape has been fully read.

It will readily be understood, that whilst I have described an embodiment in which a pair of tape reading heads are operatively associated with respective ones of a pair of type printing heads, a greater number of tape reading heads each with an associated type printing head could be provided, by means of which the reading and printing rate of the apparatus could be still further increased. The only limitation on the number of reading and associated printing heads used would be that of the space required to incorporate them in the apparatus.

While the principles of the invention have been described above in connection with specific embodiments, and particular modifications thereof, it is to be clearly understood that this description is made only by way of example and not as a limitation on the scope of the invention.

What I claim is:

1. Type printing apparatus, comprising a first reading head for reading information from a part of a tape; a first printing head controlled by said first reading head; a second reading head for reading information from another part of the tape simultaneously with said first reading head and similarly controlling a second printing head; both printing heads being arranged to print on the same sheet of paper; means for feeding the tape through the apparatus at a speed in excess of the reading speed; means operative for causing the said parts of the tape to be moved past the corresponding reading heads at reading speed during a reading period, and to cause the whole of the said other part of the tape to move at a faster rate past the said first reading head during a period following the reading period; and means for inhibiting the said reading heads when the said other part of the tape is being moved at a faster rate past the said first reading head.

2. Type printing apparatus as claimed in claim 1, in which the printing heads are arranged to print different halves of a single line of print on the said sheet, and in which means is provided for returning the printing heads to positions corresponding to the starts of different halves of a new single line of print.

3. Type printing apparatus as claimed in claim 1 in which the said means operative comprises a first pair of rollers rotatably arranged in spaced relationship between feeding members of the said feeding means and between which the said tape reading heads are arranged; a second pair of rollers rotatably affixed to different ends of a rocker arm; cam means acting on the said rocker arm to move one of the said second pair of rollers thereon toward and between one of the said first pair of rollers and an adjacent one of the said feeding members and the other one of the said second pair of rollers away from the other of the said first pair of rollers and an adjacent one of the said feeding members; and in which a portion of the said tape is arranged in its path between the said feeding members and in such relationship with the said pairs of rollers that movement of the said second pair of rollers on the rocker in one direction causes said parts of the tape to be moved past corresponding reading heads at reading speed during the reading period, and that movement of the said second pair of rollers on the rocker in a reverse direction causes the whole of said other part of the tape to move at a faster rate past said first reading head during the period following the reading period.

References Cited in the file of this patent

UNITED STATES PATENTS 1,785,999 Bryce ------------------ Dec. 23, 1930